United States Patent Office 3,773,832
Patented Nov. 20, 1973

3,773,832
HYDROGENATION OF ADIPONITRILE OVER ALKALI-MODIFIED COBALT CATALYST
Loren Dale Brake, Wilmington, Del., assignor to E. I. du Pont de Nemours and Company, Wilmington, Del.
No Drawing. Filed Jan. 16, 1970, Ser. No. 3,477
Int. Cl. C07c 85/12
U.S. Cl. 260—583 K                                                5 Claims

ABSTRACT OF THE DISCLOSURE

Hexamethylenediamine is prepared by hydrogenating adiponitrile in the presence of an excess of hydrogen at a total system pressure of from 3000 to 6000 p.s.i.g. in the presence of from about 200 to 800% of ammonia, based on the weight of the adiponitrile, at a temperature of from about 85° C. to about 185° C. in the presence of a pelleted, sintered, reduced cobalt oxide catalyst on which is maintained from about 200 to less than 1000 parts per million of a strong base.

BACKGROUND OF THE INVENTION

This invention relates to the manufacture of hexamethylenediamine.

Hexamethylenediamine is made on the large scale as an intermediate for the manufacture of nylon usually by hydrogenation of adiponitrile. The hydrogenation is conducted continuously under pressure at elevated temperature by mixing adiponitrile with a large excess of ammonia and hydrogen, and passing the mixture through a catalyst bed usually composed of copper, nickel or cobalt with or without a support.

The most often occurring problems are low yields due to the production of about a 5% yield of by-product tars, condensation products produced by deamination during hydrogenation and secondary amines. One method for liquid phase hydrogenation of adiponitrile discloses carrying out the reaction in the presence of a concentrated aqueous solution of a strong base. See U.S. Pat. No. 2,449,036. The reaction is carried out using a cobalt or nickel catalyst at temperatures below 100° C. and as a result requires long reaction times and results in considerable by-product formation.

SUMMARY OF THE INVENTION

The invention consists of the improvement of the process for the catalytic hydrogenation of adiponitrile to hexamethylenediamine by maintaining on a pelleted sintered reduced cobalt oxide catalyst a trace amount of a strong base to improve the yield of hexamethylenediamine by suppression of the production of secondary amines.

DESCRIPTION OF THE INVENTION

The invention consists of modification of a process for hydrogenation of adiponitrile to hexamethylenediamine comprising admixing adiponitrile with an excess of hydrogen at a system pressure of from 3000 to 6000 p.s.i.g. in the presence of from about 200 to 800% of ammonia, based on the weight of adiponitrile, the improvement in the process being the conduction of said process at a temperature of from about 85 to about 185° C. in the presence of a pelleted sintered reduced cobalt oxide catalyst on which is continuously maintained from about 200 to less than 1000 parts per million (p.p.m.) of a strong base.

The strong base can be introduced onto the catalyst and the trace concentration of the strong base maintained thereon by incorporating into an acid-free adiponitrile feed from about 5 to about 30 p.p.m. of the strong base, calculated on the basis of acid-free adiponitrile. The adiponitrile, hydrogen and ammonia feed should be essentially anhydrous, that is to say, it should contain less than about 1000 p.p.m. of water. In continuous operation without continuous addition of base, the small amount of water present in the adiponitrile, hydrogen and ammonia feed tends to leach the base from the catalyst surface. Bases having high solubility in adiponitrile and hexamethylene-diamine will tend to be leached off even in the absence of water. The base on the catalyst surface must therefore be in dynamic equilibrium with base in the adiponitrile, ammonia and hexamethylenediamine and thus as the solubility of the base in adiponitrile and hexamethylenediamine increases the effect that water in the feed has on base desorption from the catalyst surface increases, requiring increased amounts of base in the adiponitrile feed.

The base modification of catalyst does cause some loss of catalytic activity but at optimum strong base concentration adsorbed on the catalyst surface the formation of secondary amines is no longer temperature dependent and thus the loss of catalyst activity can be more than compensated for by an increase in the synthesis exit temperature from the normal 135 to 140° C. to about 185° C. which of course results in an increase in reaction rate and productivity. Base modification also suppresses formation of polyamines, tars, and other residues which cause short term catalyst fouling and thus results in increased catalyst life. Catalysts which have been base promoted can be regenerated after loss of activity by conventional regeneration procedures without changing the level of the adsorbed base on the catalyst surface.

The most striking improvement in the process for hydrogenation of adiponitrile is the suppression of formation of secondary amines, such as hexamethyleneimine and bishexamethylenetriamine, resulting in as much as a 1-2% increase in yield of hexamethylenediamine. No significant increase in other by-products was noted at optimum alkali concentrations.

The amount of strong base on the catalyst surface can be determined by conventional wet chemical analysis method. Strong base in excess of about 1000 parts per million on the cobalt catalyst results in the increased production of the undesirable by-product diaminocyclohexane and 2-aminomethylcyclopentylamine.

The moderating effect of a strong base on the active cobalt catalyst is related to the surface area of the catalyst. Commercially available pelleted cobalt oxide having a nominal size of ⅛-inch length by ⅛-inch diameter generally has a surface area ranging from 4.5 to 13.4 m.²/gm., depending on the amount of breakage which occurs during shipment and handling. When the cobalt oxide is reduced to form the active cobalt catalyst the surface area is reduced and generally falls in the range of 1–3 m.²/gm. The average surface area is approximately 2 m.²/gm. Therefore, when the concentration of the strong base on the catalyst is expressed as from about 200 p.p.m. to less than 1000 p.p.m., this results in a concentration of base on the catalyst surface which ranges from about .0001 gm./m.² to less than .0005 gm./m.². The range of strong base expressed in gm./m.² is from about .0001 gm./m.² to about .0005 gm./m.², preferably from .0001 gm./m.² to .0045 gm./m.² and most preferably from .0002 gm./m.² to .0004 gm./m.².

The concentration of strong base adsorbed on the catalyst surface is from about 200 to less than 1000 parts per million (p.p.m.), preferably from about 200 to 900 p.p.m. and most preferably from about 400 to 800 p.p.m.

Strong bases useful in this invention are methoxides, and hydroxides of a metal selected from Group I-A of the Periodic Chart, calcium and barium hydroxides and quaternary ammonium hydroxides selected from the group having the formula $R_4N^{+-}OH$ where R is alkyl of from 1–18 carbon atoms, preferably from 1–4 carbon atoms, and aryl from 6–10 carbon atoms.

Hydrogenation of adiponitrile over the modified cobalt catalyst can be conducted in the presence of from 200 to 800% of ammonia. The preferred ammonia concentration is about 400%.

Reaction temperatures used in this invention will be in the range of from about 85° C. to about 185° C. and is preferably from about 100° C. to about 170° C.

This invention will be better understood by reference to the following illustrative examples, wherein parts and percentages are by weight unless otherwise specified.

EXAMPLES

Example I

Adiponitrile containing 11.9 parts per million of potassium hydroxide was fed at a rate of 140 parts per hour to a fixed bed hydrogenation converter containing 180 parts of 1/8″ x 1/8″ pellets of sintered reduced cobalt oxide catalyst. Approximately 550 parts per hour of ammonia and an excess of hydrogen were also introduced to the converter inlet. The combined adiponitrile, hydrogen and ammonia feed contained .03 wt. percent water. The converter inlet temperature was 105° C. and the exit temperature was 160° C. The total pressure of the system was about 5000 p.s.i.g. The crude hexamethylenediamine was analyzed after the removal of the ammonia. The feed rates, temperatures and analysis for secondary amines and water in the hexamethylenediamine is summarized in Table I.

EXAMPLES II–VI

Examples II and III were run by the process of Example I. The feed rates, temperatures and analysis for secondary amines and water in Examples II and III are summarized in Table I. Examples IV to VI were run by a method similar to Example I but with no addition of potassium hydroxide to the adiponitrile feed. The feed rates, conversion temperatures and secondary amines analysis of Examples IV to VI are also summarized in Table I.

EXAMPLES VII AND VIII

These examples were also run by a method similar to that of Example I. The feed rates, temperatures, secondary amines and water analysis are summarized in Table I.

EXAMPLE IX 100 parts per hour of adiponitrile containing 13.8 parts per million potassium hydroxide was fed with approximately 550 parts per hour of ammonia to the first converter of a 2-converter series unit. Each converter contained 180 parts of the catalyst described in Example I. The combined adiponitrile. $H_2$ and ammonia feed contain .07 wt. percent water. The first converter operated with an inlet temperature of 118° C. and exit temperature of 163° C. The entire effluent stream from the first converter, including the remainder of hydrogen from that converter, was mixed with 115 parts per hour of adiponitrile containing 7.6 parts per million potassium hydroxide, cooled to 122° C. and fed to the second converter of the series unit. After hydrogenation, the temperature exit of the second converter was 175° C. The crude hexamethylenediamine after the removal of the ammonia contained impurities as sumarized in Table I.

EXAMPLES X AND XI

A series conversion operation containing 2 converters was run similar to Example IX without the addition of potassium hydroxide to the adiponitrile feed. The feed rates, temperatures and secondary amines analysis are as summarized in Table I.

TABLE I

| Example | Input feed | | | | Converter temp., ° C. | | Wt. percent in HMD product | | |
|---|---|---|---|---|---|---|---|---|---|
| | KOH, p.p.m. ADN | ADN, p.p.h. | NH₃, p.p.h. | H₂O, wt. percent | Inlet | Exit | HMI | BHMT | H₂O |
| I | 11.9 | 140 | 550 | .03 | 105 | 160 | .18 | .31 | .14 |
| II | 13.9 | 135 | 560 | .033 | 107 | 160 | .14 | .25 | .17 |
| III | 9.5 | 150 | 550 | .023 | 106 | 170 | .23 | .34 | .10 |
| IV | | 180 | 530 | | 85 | 145 | .68 | .98 | |
| V | | 200 | 520 | | 88 | 145 | .81 | 1.04 | |
| VI | | 125 | 560 | | 96 | 145 | .86 | 1.22 | |
| VII | 13.6 | 125 | 560 | .028 | 113 | 170 | .06 | .12 | |
| VIII | 7.1 | 140 | 550 | | 109 | 170 | .15 | .21 | |
| IX | 13.80 / ᵇ 7.6 | ᵃ 100 / ᵇ 115 | ᵃ 550 | .07 | ᵃ 118 / ᵇ 122 | ᵃ 163 / ᵇ 175 | ᵇ .10 | ᵇ .25 | ᵇ .23 |
| X | | ᵃ 140 / ᵇ 110 | ᵃ 550 | | | ᵃ 135 / ᵇ 135 | ᵇ .26 | ᵇ .92 | |
| XI | | ᵃ 86 / ᵇ 108 | ᵃ 590 | | | ᵃ 140 / ᵇ 137 | ᵇ .47 | ᵇ 1.03 | |

ᵃ 1st reactor.
ᵇ 2d reactor.

NOTE.—ADN=Adiponitrile; HMI=Hexamethyleneimine; BHMT=Bis-hexamethylenetriamine; HMD= Hexamethylenediamine.

EXAMPLES XII TO XVI

The system consists of two hydrogenation reactors in series with intercooling between the reactors. A mixture of adiponitrile, excess hydrogen and ammonia is fed to the first (A) reactor. Additional adiponitrile (ADN) is fed to the 2nd (B) reactor. Each reactor contains approximately 122.5 parts of cobalt catalyst as described in Example I. During the test described in this example only the NaOH level and the exit temperatures on the A and B reactors were varied. The following conditions remained constant:

ADN feed to A reactor, 100 parts/hr. (p.p.h.);
ADN feed to B reactor, 80 parts/hr.;
NH₃ feed to A reactor, 390 parts/hr.;
Hydrogen sufficient to maintain the pressure in the A reactor at 5000 p.s.i.g. was supplied. The pressure in the B reactor was approximately 4700 p.s.i.g. Feed rates, temperatures and secondary amines and water analysis are shown in Table II.

TABLE II

| Example number | NaOH, p.p.m. in ADN feed | | Wt. percent H₂O feed | | Exit temp., °C. | | Wt. percent in crude HMD | | |
|---|---|---|---|---|---|---|---|---|---|
| | A | B | A | B | A | B | HMI | BHMT | H₂O |
| XII | 17 | 17 | .018 | .028 | 165 | 155 | .12 | .35 | .09 |
| XIII | 17 | 17 | .018 | .028 | 178 | 156 | .15 | .49 | .09 |
| XIV | 10 | 10 | .024 | .038 | 165 | 155 | .18 | .64 | .12 |
| XV | 10 | 10 | .012 | .019 | 178 | 155 | .24 | .85 | .06 |
| XVI | 0 | 0 | | | 170 | 160 | .95 | 1.40 | |

EXAMPLE XVII

Several batch hydrogenations of adiponitrile were carried out to demonstrate the effectiveness of various strong bases in suppressing the formation of secondary amines. Conditions were as follows: An 1100 ml. stainless steel bomb was charged with 70 g. of adiponitrile, 280 g. of anhydrous ammonia, and 30 g. of a cobalt catalyst treated as described below, care being taken to exclude oxygen during the charging of the bomb. The bomb was closed, pressured at 5000 p.s.i.g. with hydrogen and heated at 110° C. until uptake of hydrogen was complete. The bomb was cooled and the contents discharged. Ammonia was evaporated from the crude hexamethylenediamine (HMD) which was analyzed for secondary amines, specifically hexamethyleneimine (HMI) and bis-hexamethylenetriamine (BHMT).

Catalysts for the various experiments were prepared by slurrying prereduced ⅛" by ⅛" sintered pellets of cobalt oxide, under a blanket of nitrogen to exclude oxygen, with a calculated amount of the particular base dissolved either in water, methanol, or a mixture of methanol and water. The catalyst was then carefully dried under vacuum leaving the base deposited on the surface of the catalyst particles.

The following results were obtained:

| Base | P.p.m. by wt. of base on catalyst | Wt. percent combined HMI and BHMT in crude HMD |
|---|---|---|
| | | 1.24 |
| LiOH | 414 | 0.20 |
| NaOH | 700 | 0.22 |
| KOH | 950 | 0.08 |
| NaOCH₃ | 850 | 0.23 |
| (CH₃)₄N⁺OH⁻ | 630 | 0.16 |
| (C₂H₅)₄N⁺OH⁻ | 1,320 | 0.08 |
| Ca(OH)₂ | 2,800 | 0.70 |
| Ba(OH)₂ | 6,180 | 0.40 |

EXAMPLE XVIII

A small amount of a 24.9% solution of potassium hydroxide in water was added to adiponitrile so as to give a concentration of potassium hydroxide in the nitrile of 11 parts per million by weight. This adiponitrile was then pumped at a rate of 150 to 180 parts per hour to a mixing junction where it was mixed with 3 to 3.6 parts of ammonia per part of nitrile and the resulting mixture was then pumped into a hydrogenation vessel with an excess of hydrogen at a total pressure of 4,500 p.s.i.g. The vessel contained a charge of 180 parts of ⅛" by ⅛" pellets of sintered reduced cobalt oxide catalyst. During the course of the experiment the amount of water in the ammonia being fed was varied so as to produce a variation in the amount of water in the system. The amount of water in the adiponitrile was held constant. The amount of water in the system was calculated from the amount of water measured in the crude hexamethylenediamine that was recovered following removal of the ammonia. The temperature of the reactants leaving the hydrogenation vessel was maintained at 145–155° C.

The conversion of adiponitrile to crude hexamethylenediamine was essentially complete.

| Weight percent | | |
|---|---|---|
| Water measured in recovered crude diamine | Water calculated in nitrile and ammonia fed | Secondary amines in crude diamine |
| 0.66 | 0.14 | 1.68 |
| 0.50 | 0.11 | 1.24 |
| 0.30 | 0.073 | 0.68 |
| 0.12 | 0.047 | 0.18 |

This example shows that the effectiveness of a fixed feed of potassium hydroxide in suppressing the formation of secondary amines is affected by increased water concentrations in the total feed and system.

What is claimed is:

1. In a process for the hydrogenation of adiponitrile to hexamethylenediamine comprising admixing adiponitrile and an excess of hydrogen at a total system pressure of from 3000 to 6000 p.s.i.g. in the presence of about 200 to 800% of ammonia based on the weight of adiponitrile, the improvement which comprises conducting the process at a temperature of from about 100° C. to about 170° C., with a feed of adiponitrile, hydrogen and ammonia that is essentially anhydrous and wherein the adiponitrile is acid-free, in the presence of a catalyst consisting essentially of a pelleted, sintered, reduced cobalt oxide on which is continuously maintained from about 200 to less than 1000 p.p.m. of a strong base of the group consisting of lithium hydroxide, sodium hydroxide, potassium hydroxide, calcium hydroxide, barium hydroxide, sodium methoxide, tetramethylammonium hydroxide and tetraethylammonium hydroxide.

2. The process of claim 1 wherein the strong base on the reduced cobalt oxide is maintained by incorporating in the adiponitrile feed from about 5 p.p.m. to about 30 p.p.m. of the strong base.

3. The process of claim 2 wherein the strong base is of the group consisting of sodium hydroxide and potassium hydroxide.

4. The process of claim 3 wherein the strong base is introduced as a solution in a solvent of the group consisting of water, methanol and a mixture of water and methanol.

5. The process of claim 2 wherein the concentration of strong base on the catalyst surface is from about 0.001 gm./m.² to less than 0.005 gm./m.².

References Cited

UNITED STATES PATENTS

| 2,449,036 | 9/1948 | Grunfeld | 260—583 K |
| 3,488,390 | 1/1970 | Carss et al. | 260—583 K |
| 2,776,315 | 1/1957 | Jefferson et al. | 260—583 K |

LEWIS GOTTS, Primary Examiner

C. F. WARREN, Assistant Examiner